(12) United States Patent
Oberthier (10) Patent No.: US 11,297,777 B2
(45) Date of Patent: Apr. 12, 2022

(54) APPARATUS AND METHODS FOR GROWING ORGANIC MATTER

(71) Applicant: John H. Oberthier, Glendale Heights, IL (US)

(72) Inventor: John H. Oberthier, Glendale Heights, IL (US)

(*) Notice: Subject to any disclaimer, the term of this patent is extended or adjusted under 35 U.S.C. 154(b) by 224 days.

(21) Appl. No.: 16/399,884

(22) Filed: Apr. 30, 2019

(65) Prior Publication Data

US 2019/0335681 A1 Nov. 7, 2019

Related U.S. Application Data

(60) Provisional application No. 62/665,481, filed on May 1, 2018.

(51) Int. Cl.

| | | |
|---|---|---|
| *B65G 17/16* | (2006.01) | |
| *A01G 9/02* | (2018.01) | |
| *A01K 63/00* | (2017.01) | |
| *B65G 23/24* | (2006.01) | |
| *A01K 63/06* | (2006.01) | |
| *A01G 9/24* | (2006.01) | |

(52) U.S. Cl.
CPC ............ *A01G 9/023* (2013.01); *A01K 63/006* (2013.01); *B65G 17/16* (2013.01); *B65G 23/24* (2013.01); *A01G 9/247* (2013.01); *A01G 9/249* (2019.05); *A01K 63/06* (2013.01); *B65G 2201/0202* (2013.01)

(58) Field of Classification Search
CPC ........ B65G 17/16; B65G 17/20; B65G 21/12; B65G 21/14; B65G 37/005; B65G 2201/0211; A01G 9/023; A01G 31/042; A01G 27/00; A01G 27/02; A01G 27/06; A01G 27/006

USPC .............. 198/347.1, 339.1, 617, 681, 861.1; 47/1.1, 65, 66.6, 66.7
See application file for complete search history.

(56) References Cited

U.S. PATENT DOCUMENTS

| | | | | | |
|---|---|---|---|---|---|
| 2,244,677 | A | * | 6/1941 | Cornell ................. | A01G 9/143 47/17 |
| 3,742,900 | A | * | 7/1973 | DeKavallas ........... | C11C 5/025 118/712 |
| D258,206 | S | * | 2/1981 | Bourke ............................. | 47/39 |
| 4,255,897 | A | * | 3/1981 | Ruthner ................. | A01G 9/249 47/65 |
| 4,317,308 | A | * | 3/1982 | Derrick ................. | A01G 18/69 47/1.1 |
| 4,356,664 | A | * | 11/1982 | Ruthner ............... | A01G 31/042 47/65 |
| 4,547,992 | A | * | 10/1985 | Wingerden .......... | A01G 31/042 47/17 |
| 4,643,495 | A | * | 2/1987 | Pepping ................. | B65G 1/127 198/800 |

(Continued)

OTHER PUBLICATIONS

Screen captures from YouTube video clip entitled "Vertical farms solve land problem," 10 pages, uploaded on Dec. 28, 2012 by user "CNN Business". Retrieved from Internet: <https://www.youtube.com/watch?v=cY7O5YNxKuI>.

*Primary Examiner* — Joseph A Dillon, Jr.
(74) *Attorney, Agent, or Firm* — L&G Law Group LLP (57) ABSTRACT

The present invention relates generally to agricultural growing apparatuses and methods. More specifically the present invention relates to a dynamic, modular, rotating apparatus, and methods related to the apparatus' use and/or function.

13 Claims, 11 Drawing Sheets

(56) References Cited

U.S. PATENT DOCUMENTS

| | | | | |
|---|---|---|---|---|
| 4,712,964 A * | 12/1987 | van Elten | | B65G 1/0407 198/468.6 |
| 4,901,471 A * | 2/1990 | van den Top | | B65G 1/04 47/1.1 |
| 5,042,196 A * | 8/1991 | Lukawski | | A01G 31/02 47/65 |
| 5,081,920 A * | 1/1992 | Kuhlmann | | A01G 18/70 99/639 |
| 5,584,141 A | 12/1996 | Johnson | | |
| 5,611,422 A * | 3/1997 | Harkonen | | B65G 17/123 198/681 |
| 6,053,304 A * | 4/2000 | Biagiotti | | B65G 47/5122 198/794 |
| 6,055,771 A * | 5/2000 | Warnacut | | A01C 1/02 47/58.1 R |
| 6,122,861 A * | 9/2000 | Kertz | | A01G 31/04 47/65 |
| 7,051,866 B2 * | 5/2006 | Irish | | A47F 10/06 198/465.4 |
| 7,073,657 B2 * | 7/2006 | Langenegger | | B65G 47/5131 198/460.1 |
| 7,168,206 B2 | 1/2007 | Agius | | |
| 7,258,221 B2 * | 8/2007 | Di Nardo | | B65G 47/5122 198/347.3 |
| 7,798,313 B2 * | 9/2010 | Hesketh | | B65G 23/44 198/814 |
| 8,037,994 B2 * | 10/2011 | Schaefer | | B65G 1/133 198/456 |
| 8,151,518 B2 | 4/2012 | Adams et al. | | |
| 8,162,127 B2 * | 4/2012 | Humele | | B65G 17/18 198/347.1 |
| 8,196,735 B2 * | 6/2012 | Sakita | | B65G 17/126 198/712 |
| 9,010,022 B2 * | 4/2015 | Brusatore | | A01G 31/06 47/83 |
| 9,345,201 B2 | 5/2016 | Sakura et al. | | |
| 9,730,400 B2 | 8/2017 | Wilson et al. | | |
| 10,112,814 B1 * | 10/2018 | Shelor | | B65G 17/16 |
| 10,144,595 B2 * | 12/2018 | Philipp | | B65G 47/57 |
| 10,231,393 B2 * | 3/2019 | Nelson | | A01G 9/023 |
| 10,322,880 B2 * | 6/2019 | Collin | | B65G 1/1378 |
| 2002/0056392 A1 * | 5/2002 | Sameit | | B41F 13/0016 101/484 |
| 2003/0118428 A1 * | 6/2003 | McFarland | | B65G 35/08 414/331.04 |
| 2004/0149541 A1 * | 8/2004 | Sauer | | B65G 1/127 198/347.2 |
| 2009/0107037 A1 | 4/2009 | Alinski | | |
| 2009/0272623 A1 * | 11/2009 | Berdelle-Hilge | | B07C 3/082 198/370.01 |
| 2010/0114362 A1 * | 5/2010 | Zumbrunn | | B65G 1/133 700/218 |
| 2010/0138041 A1 * | 6/2010 | Benz | | B65G 47/5104 700/247 |
| 2010/0236147 A1 * | 9/2010 | Brusatore | | A01G 31/047 47/59 R |
| 2012/0070261 A1 * | 3/2012 | Visser | | A01G 9/143 414/753.1 |
| 2012/0124904 A1 * | 5/2012 | Marchildon | | A01G 31/047 47/65 |
| 2012/0311926 A1 * | 12/2012 | Mittelmark | | F24F 3/16 47/17 |
| 2013/0180172 A1 | 7/2013 | Silverberg | | |
| 2015/0059243 A1 | 3/2015 | Parker | | |
| 2015/0150198 A1 * | 6/2015 | Sinha | | A01G 27/00 47/82 |
| 2015/0239665 A1 * | 8/2015 | Toebes | | B65G 1/04 414/808 |
| 2015/0351329 A1 * | 12/2015 | Heidi | | A01G 9/247 211/49.1 |
| 2018/0132441 A1 * | 5/2018 | Harker | | B65G 47/34 |
| 2019/0183069 A1 * | 6/2019 | Sawyer | | A01G 9/243 |
| 2020/0359568 A1 * | 11/2020 | Twito | | A01G 27/006 |
| 2021/0002073 A1 * | 1/2021 | Schuler | | B65G 1/0457 |
| 2021/0007301 A1 * | 1/2021 | Do | | A01G 27/005 |
| 2021/0024295 A1 * | 1/2021 | Stiegler | | B65G 35/08 |

* cited by examiner

APPARATUS AND METHODS FOR GROWING ORGANIC MATTER

BACKGROUND OF THE INVENTION

The present invention relates generally to agricultural growing apparatuses and methods. More specifically the present invention relates to a dynamic, modular, rotating hydroponic apparatus and methods related to the apparatus' use and/or function.

Hydroponic methods used to irrigate and/or grow plants are well known. However, problems abound with known prior art systems. For example, there is significant cost associated with hydroponically producing plants. Oftentimes, hydroponic growers need "hothouses" to adequately nourish their plants; however, for an individual farmer, constructing such a "hothouse" to grow more than a few plants at a time is both challenging to build and cost prohibitive. Given rising land-costs and transportation-related considerations, among other things, many farmers cannot generate a minimal commercial yield. Thus, many individual farmers have looked elsewhere to generate revenue.

Additionally, other deficiencies within the prior art exist. Both hydroponic and aquaponic farmers continue to struggle with replenishing growth media in a consistent manner. Furthermore, because repositioning existing apparatuses is difficult, plants often do not receive optimal, growth-sustaining amounts of light. Moreover, existing apparatuses inadequately address the farmer's ability to create a flexible or dynamic system; the hydroponic growing devices on the market are rigid, unable to be easily transported, and cannot adapt to different plant loads or configurations, including over the time span of a growing season.

A further advantage of this invention is that it allows for the growing and harvesting of organic matter in close proximity to the relevant market, such as restaurants or grocery stores.

Accordingly, there is a need for new type of hydroponic growing apparatus, and methods, as described herein.

BRIEF SUMMARY OF THE INVENTION

To meet the needs described above and others, the present disclosure provides an apparatus for growing organic matter including: at least one payload carrying station, which holds organic matter, connected via at least one tubing shaft to a plurality of links configured to form a continuous link belt. The link belt interacts with and/or engages with at least two sprockets. The sprockets are attached to a support frame. The sprockets are actuated by any conventional mechanical device capable of rotating the link belt.

Moreover, a further embodiment of the apparatus for growing organic matter provides for the support frame to be modular allowing for the increase in height and therefore capacity of the apparatus.

Furthermore, an additional embodiment of the apparatus for growing organic matter may comprise a device capable of lifting and lowering the support frame.

An embodiment of this invention may also comprise at least one method for irrigating and growing organic matter by assembling and/or using the apparatus for growing organic matter.

Additional objects, advantages and novel features of the examples will be set forth, in part, in the description which follows and will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

DETAILED DESCRIPTION OF THE INVENTION

To meet the needs described above and others, the present invention provides a modular system for both hydroponically irrigating and growing organic matter, as well as at least one method for irrigating and growing organic matter. In addition to hydroponics, the present invention applies to aquaponics, aeroponics, vermiponics and any other process for irrigating, nurturing and growing organic matter.

Figure 1:
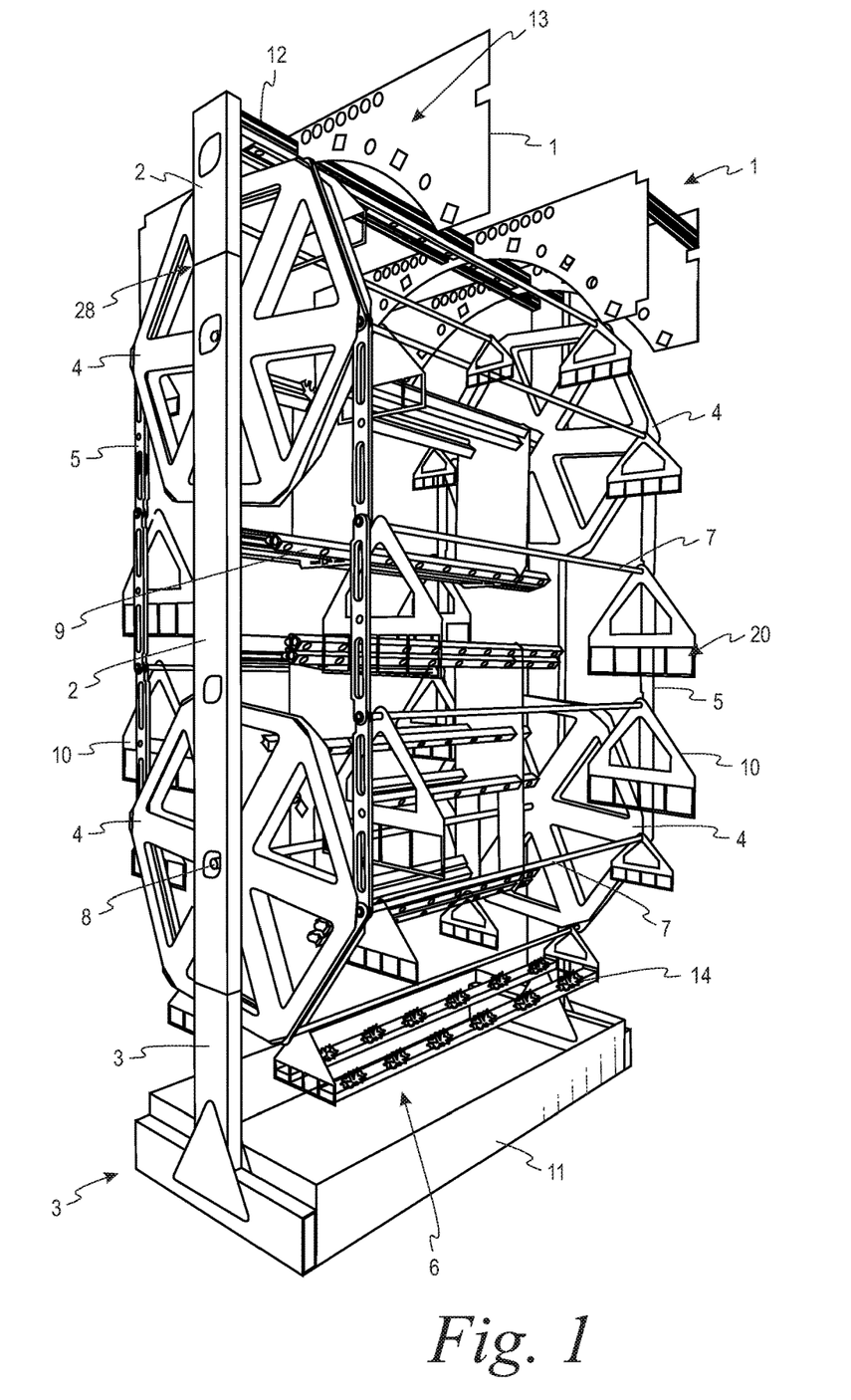
FIG. 1 is an overall perspective view of an embodiment of the apparatus for growing organic matter.

FIG. 1 is a perspective view of an apparatus. FIG. 1 shows: crown 1 pieces; support frame 2 pieces; base 3 pieces; sprockets 4; link-belt 5; payload carrying station 6; tubing shafts 7; through shafts 8; light bars 9; triangular side plates 10 comprising square cutouts 20; a tank 11; horizontal supports 12 between the apparatus' parts; and various holes and cutouts 13 to accommodate cords, light assemblies, payload carrying stations 6, and fasteners; in addition to other parts of the apparatus. Plants 14 are also shown inside one of the payload carrying stations 6. An extender-coupler insert 28 is also shown.

Figure 2:
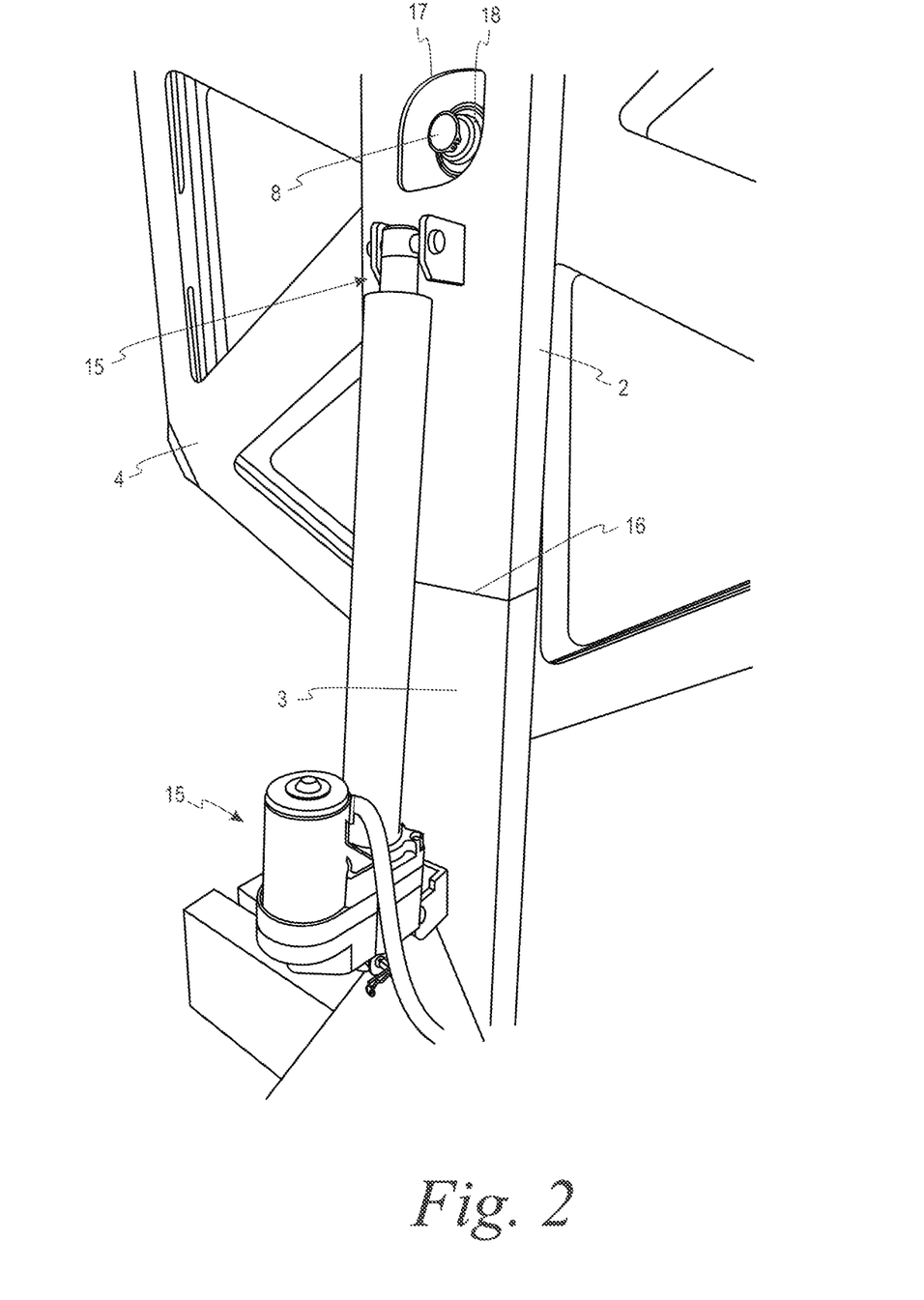
FIG. 2 is an enlarged view of an apparatus for growing organic matter, including a linear gear drive with a closed split.

FIG. 2 is a close-up view of an apparatus, showing an apparatus' linear gear drive 15 with split 16 closed. The custom cutout 17 with flanged bearing assembly 18 is also shown on a modular frame 2 piece. At the center of the custom cutout 17, the through shaft 8 may be seen protruding. Additionally, the sprocket 4 may be seen. The sprocket 4 is shown connect to the through shaft 8 to the support frame 2 via the custom cutout 17 and flanged bearing assembly 18. The connection between the gear drive 15 and the support frame 2 is also visible in FIG. 2.

Figure 3:
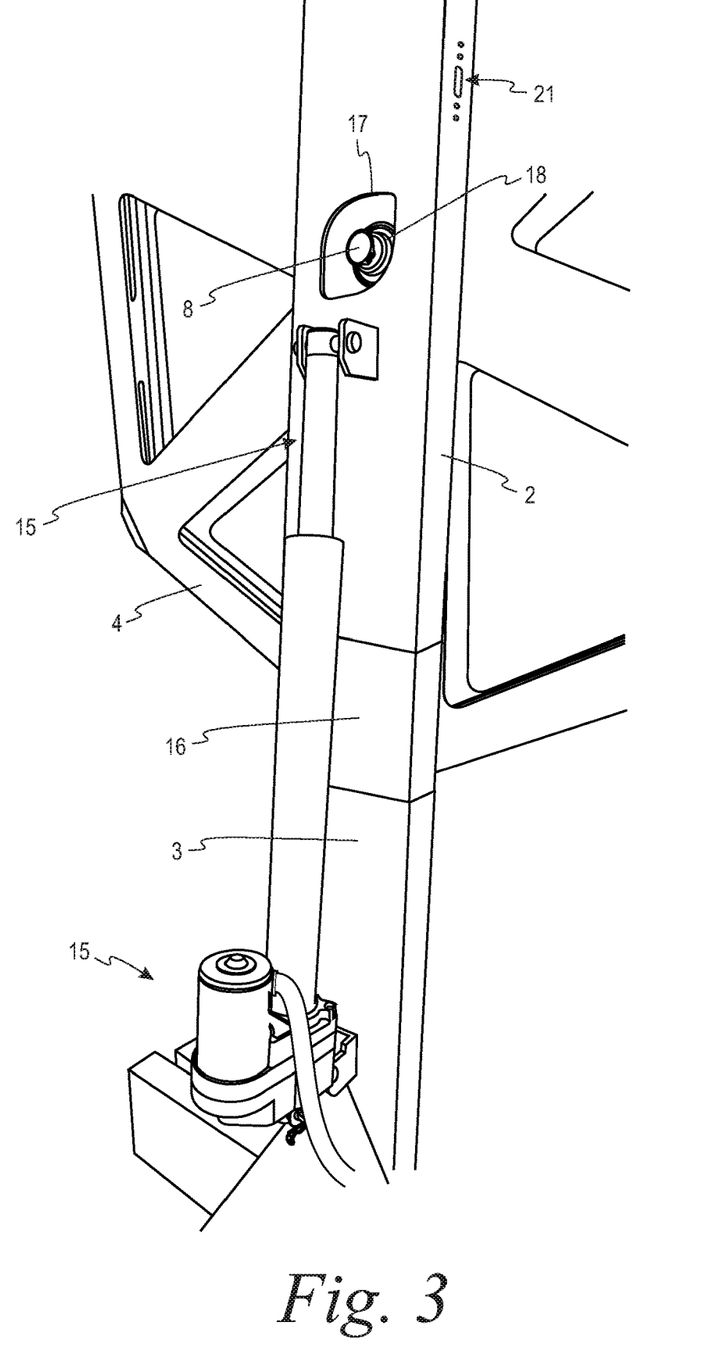
FIG. 3 is an enlarged view of an apparatus for growing organic matter, including a linear gear drive with an open split.

FIG. 3 is a close-up view of an apparatus, showing an apparatus' linear gear drive 15 with split 16 open. FIG. 3 shows the gear drive 15 in an extended position and also shows how pieces of the support frame 2 and base 3 may pull apart to elevate the apparatus. Once again the custom cutout 17 with flanged bearing assembly 18 is shown on a support frame 2 piece. Additionally, the connection between the through shaft 8, sprocket 4 and a support frame 2 piece is shown. An adaptive hard-mounting point 21 is also visible in FIG. 3.

Figure 4:
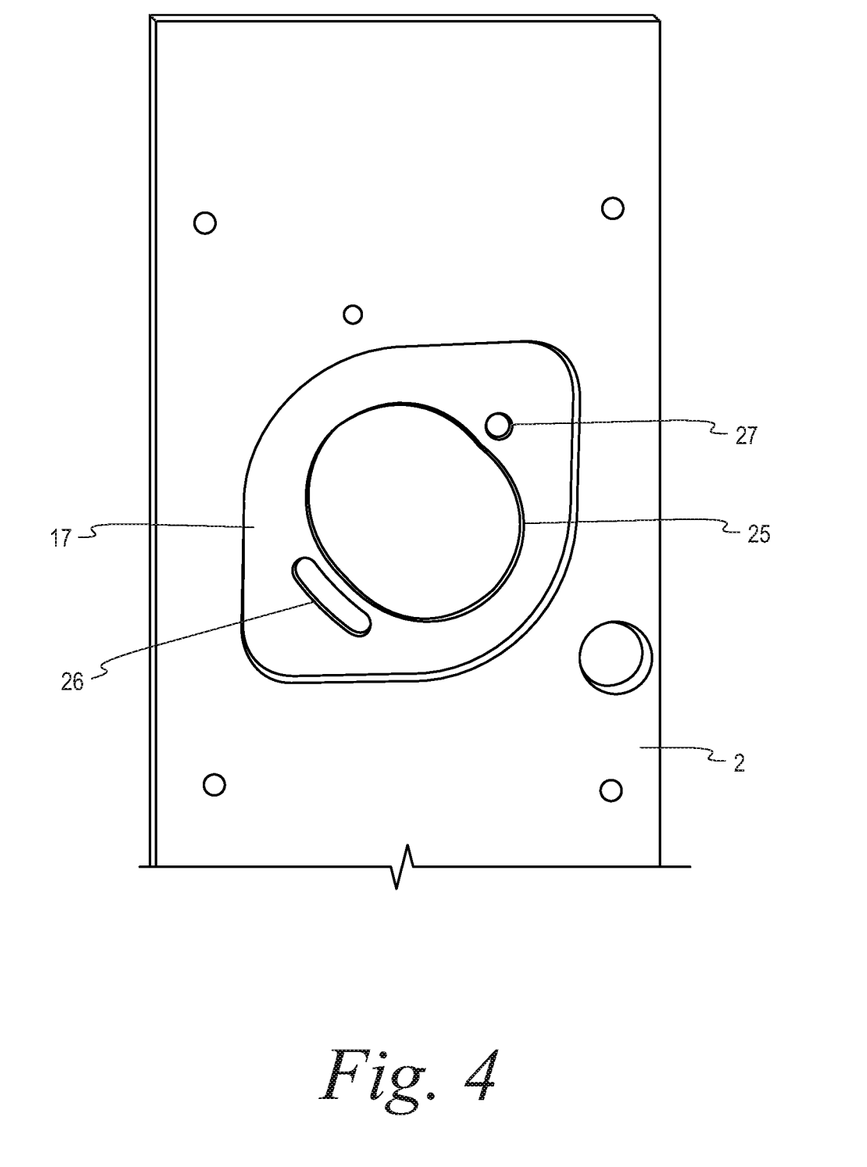
FIG. 4 is an enlarged view of an apparatus for growing organic matter, including a custom designed hole configured to accommodate a flanged bearing assembly and a through shaft.

FIG. 4 is a close-up view of an apparatus, showing a custom designed hole—configured to accommodate a flanged bearing assembly 18 and a through shaft 8. The figure also shows the kidney bean shape pocket 25, slit 26, and different holes, including the pivot point 27 to accommodate fasteners. The cutout 17 shown may be configured to accommodate for fastening between different apparatus parts, including but not limited to the through shaft 8, to a modular support frame 2 piece.

Figure 5:
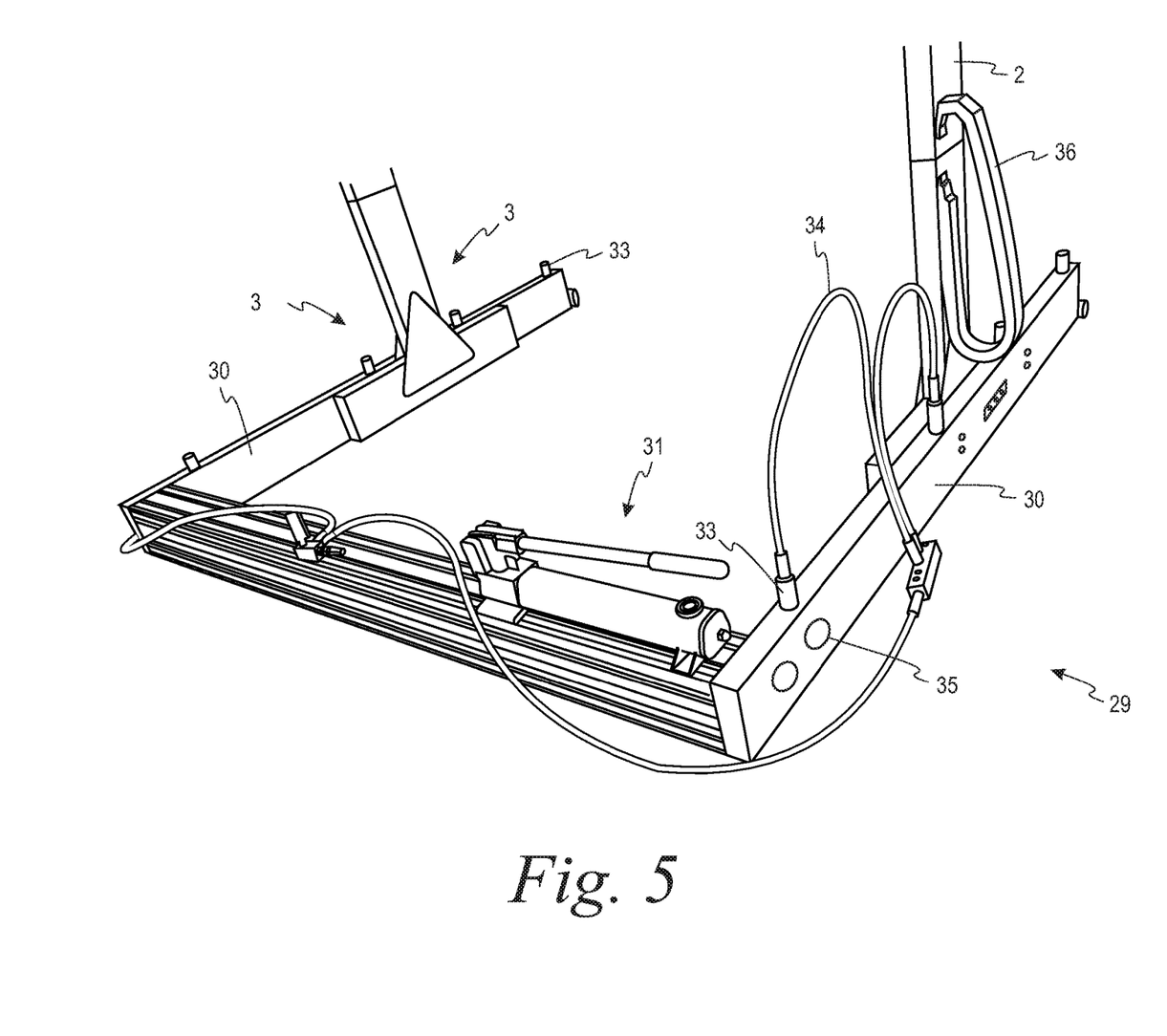
FIG. 5 is an enlarged view of an apparatus for growing organic matter, including a lifting and mobility system or shuttle.

FIG. 5 is a close-up view of an apparatus' base 3, showing a lifting and mobility system 29, or shuttle 29. The mobility system 29 shown comprises: a tubing beam 30; hand pump 31; ball bearings 33 connecting the base 3 of the system 29 and non-affixed contact to the ground—providing multi-directional motion and mobility; and cords 34 providing hydraulic to the mobility system 29. Moreover, various pockets 35 are shown; these are configured to attach the mobility system 29 to the apparatus shown and other devices. Additionally, the apparatus' base 3 pieces are shown connected to the mobility system 29. A cable carrier 36 is shown connecting two of the apparatus' support frame 2 and base 3 pieces.

Figure 6:
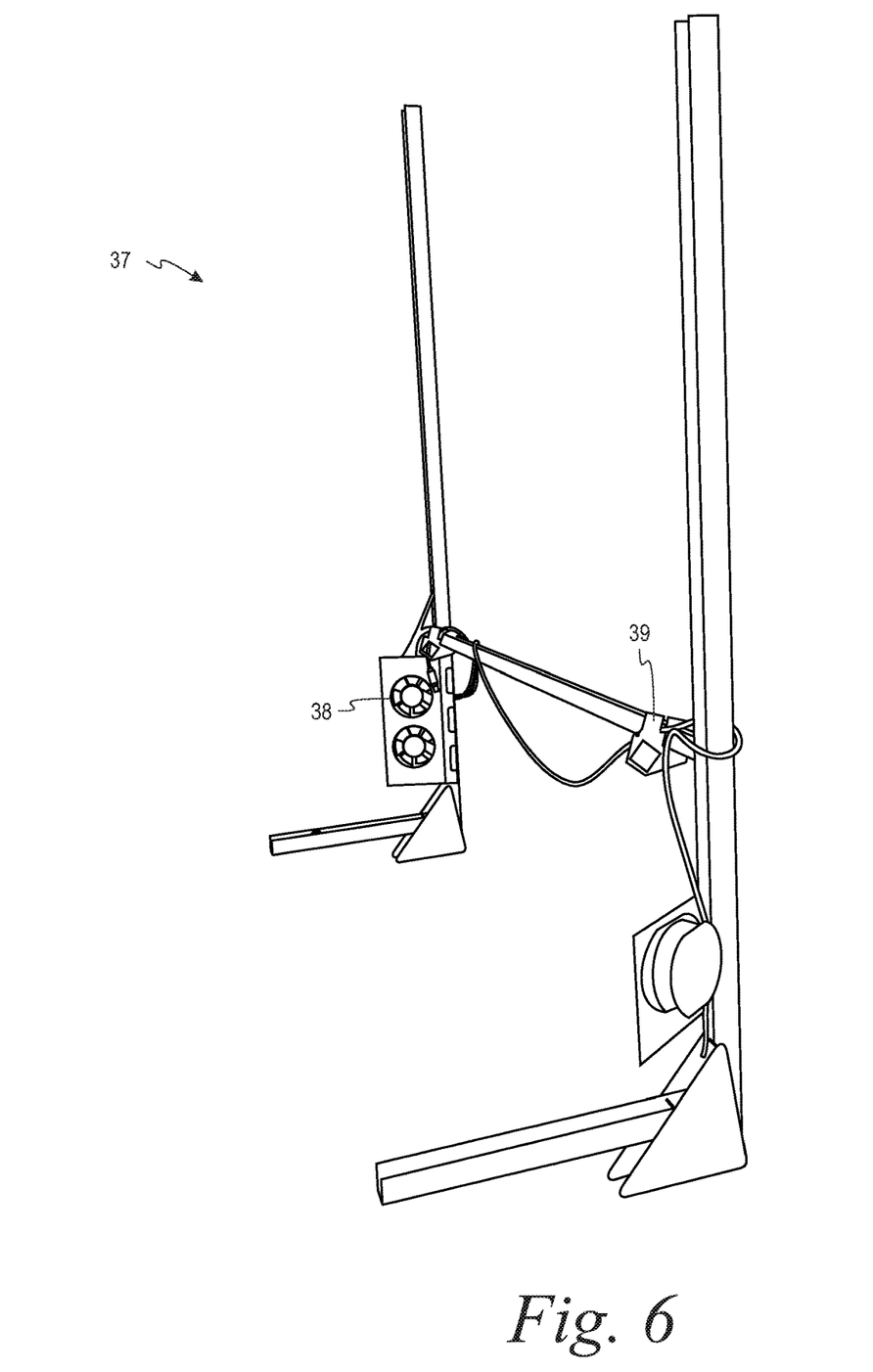
FIG. 6 is a perspective view of an outrigger system.

FIG. 6 is a perspective view of an outrigger system 37. The system shown comprises cooling fans 38 and lighting bar support 39, in addition to other features.

Figure 7:
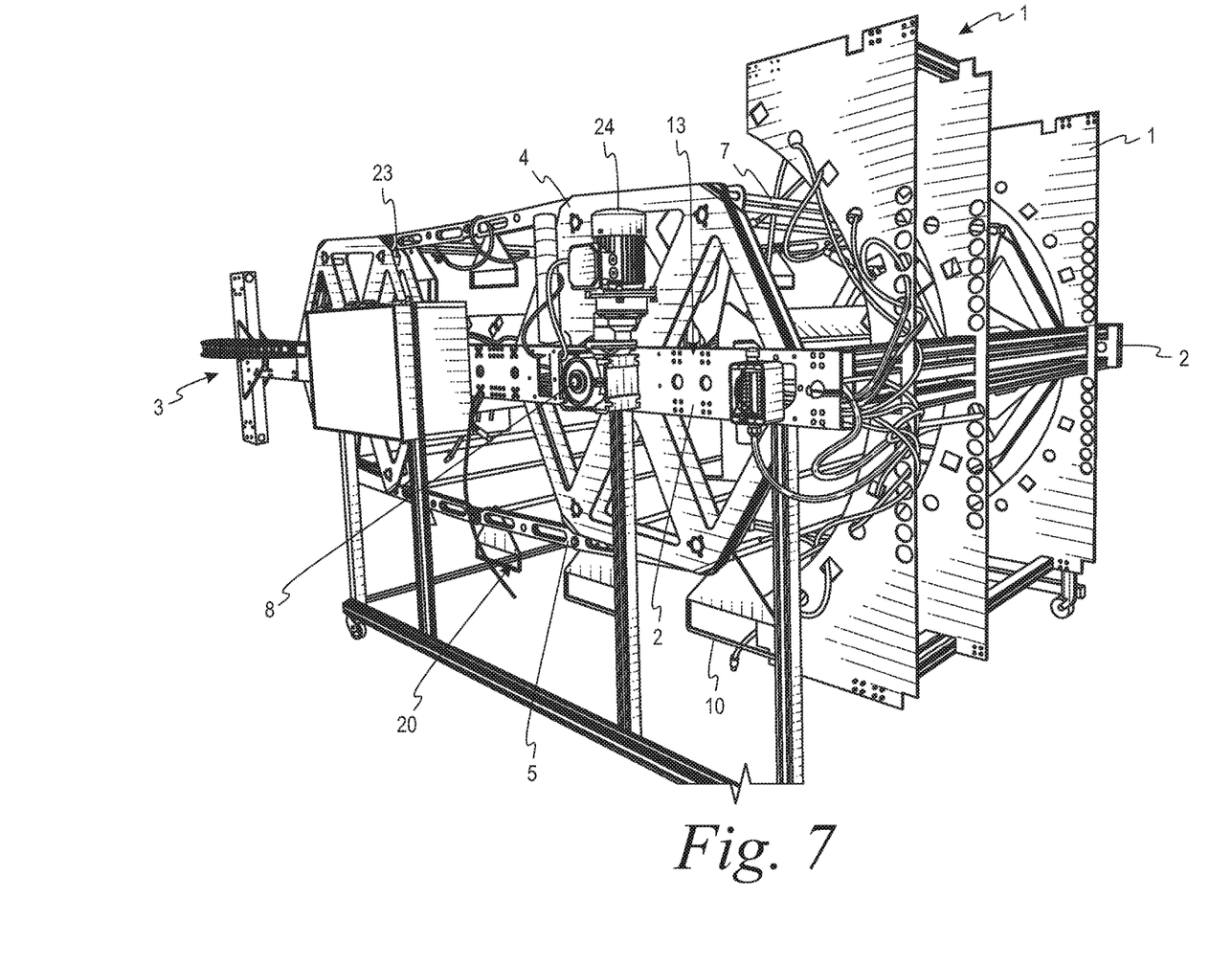
FIG. 7 is a perspective side view of an embodiment of an apparatus for growing organic matter, including a primary mover.

FIG. 7 is a perspective side view of an apparatus. FIG. 7 shows: crown 1 pieces; support frame 2 pieces; base 3 pieces; sprockets 4; link-belt 5; tubing shafts 7; through shafts 8; triangular side plates 10 comprising square cutouts 20; and various holes and cutouts 13 to accommodate cords, light assemblies, payload carrying stations 6, and fasteners; in addition to other parts of the apparatus. A primary mover 24 and a sprocket 4 tooth 23 are also shown.

Figure 8:
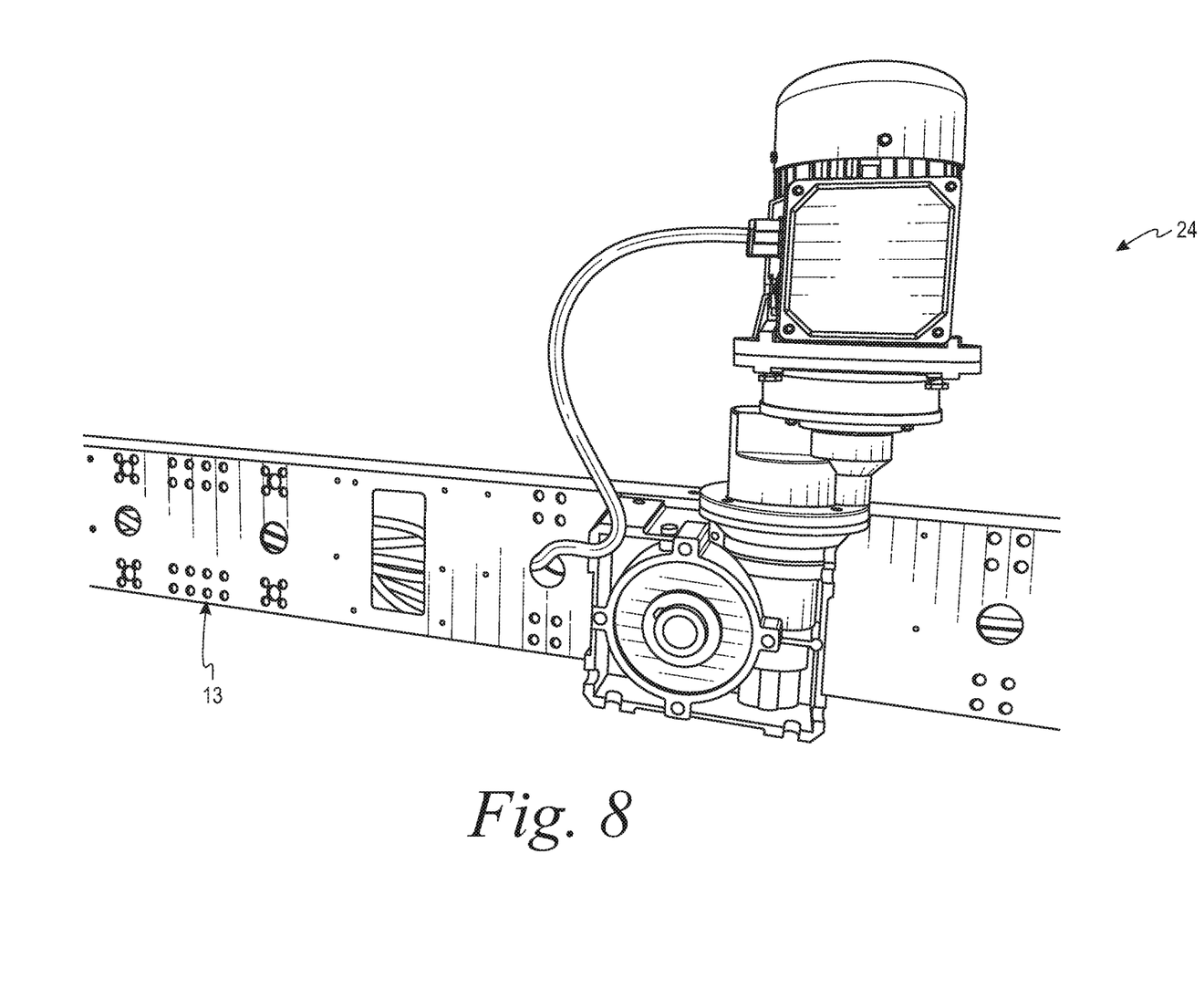
FIG. 8 is an enlarged view of a primary mover for an apparatus for growing organic matter.

FIG. 8 is a close up view of a primary mover 24 for an apparatus. Various holes and cutouts 13 are also visible in FIG. 8.

Figure 9:
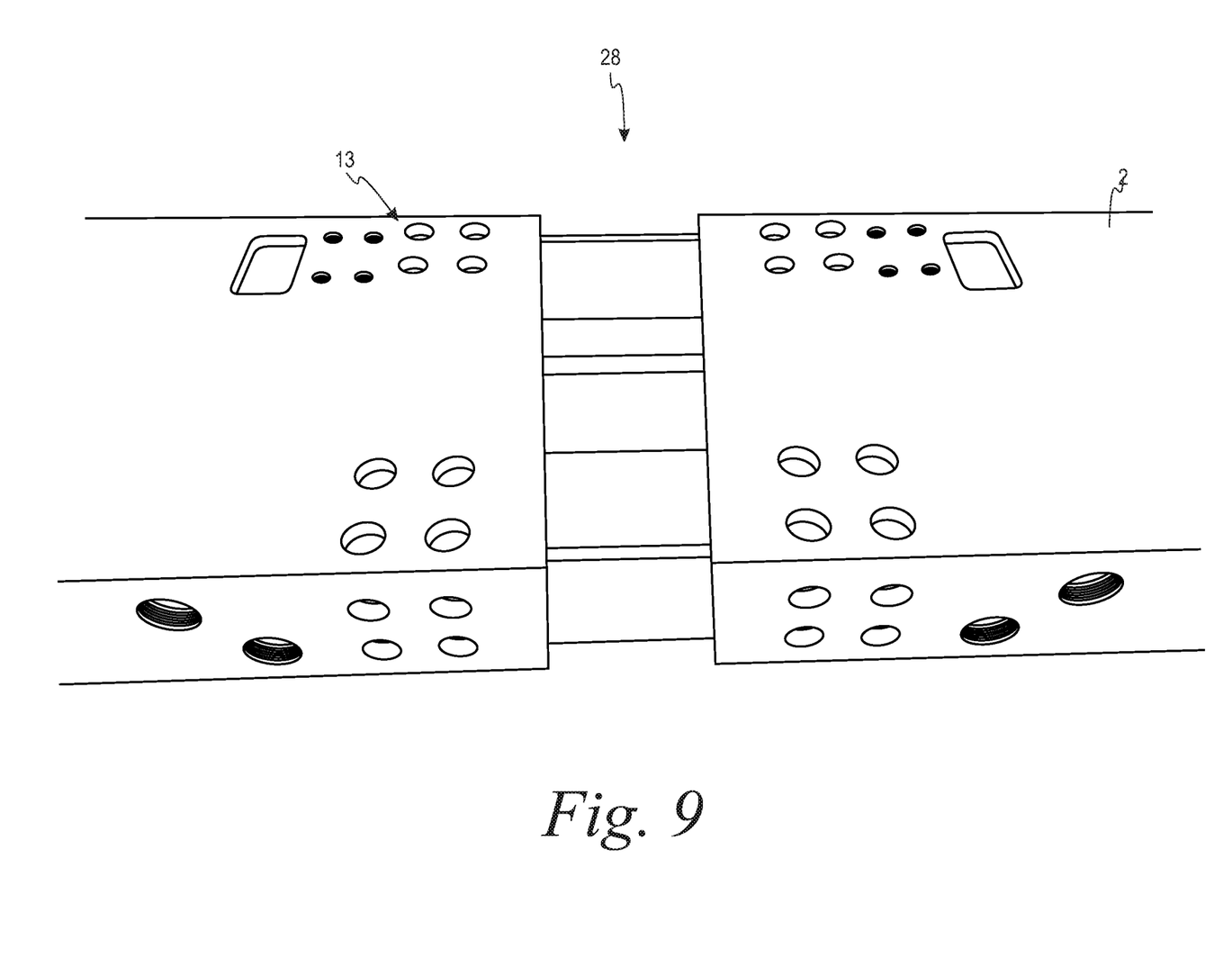
FIG. 9 is an enlarged view of an apparatus for growing organic matter, including an extender-coupler insert.

FIG. 9 is close up view of an extender-coupler insert 28 for an apparatus. Support frame 2 pieces and various holes and cutouts 13 are also visible in FIG. 9.

Figure 10:
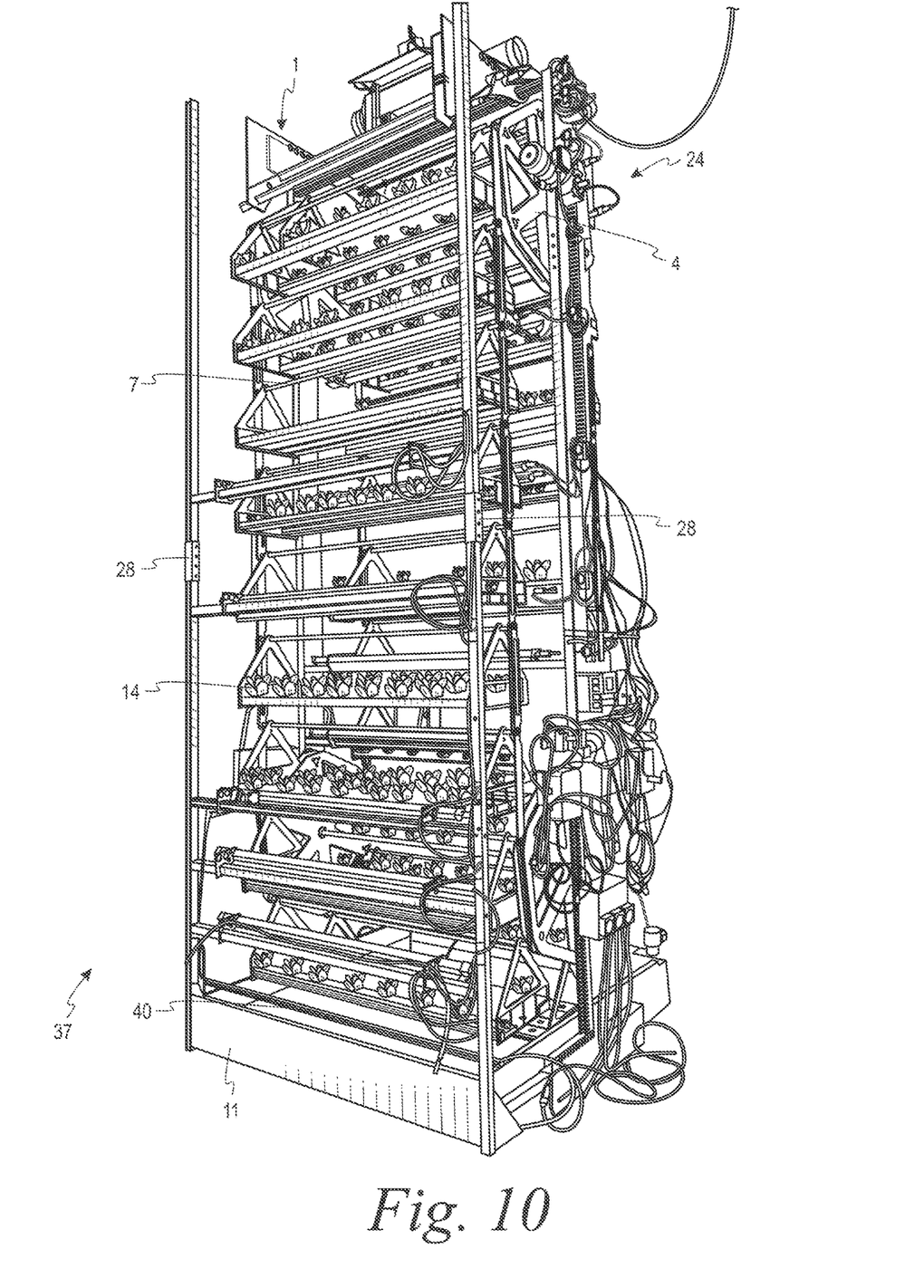
FIG. 10 is an overall perspective view of an embodiment of an apparatus for growing organic matter and an outrigger system.

FIG. 10 is a perspective view of an apparatus and an outrigger system 37. FIG. 10 also shows: crown 1 pieces; sprockets 4; tubing shafts 7; a tank 11; a primary mover 24; in addition to other parts of the apparatus. Plants 14 are also shown inside one of the payload carrying stations 6. An extender-coupler insert 28 is also shown.

Figure 11:
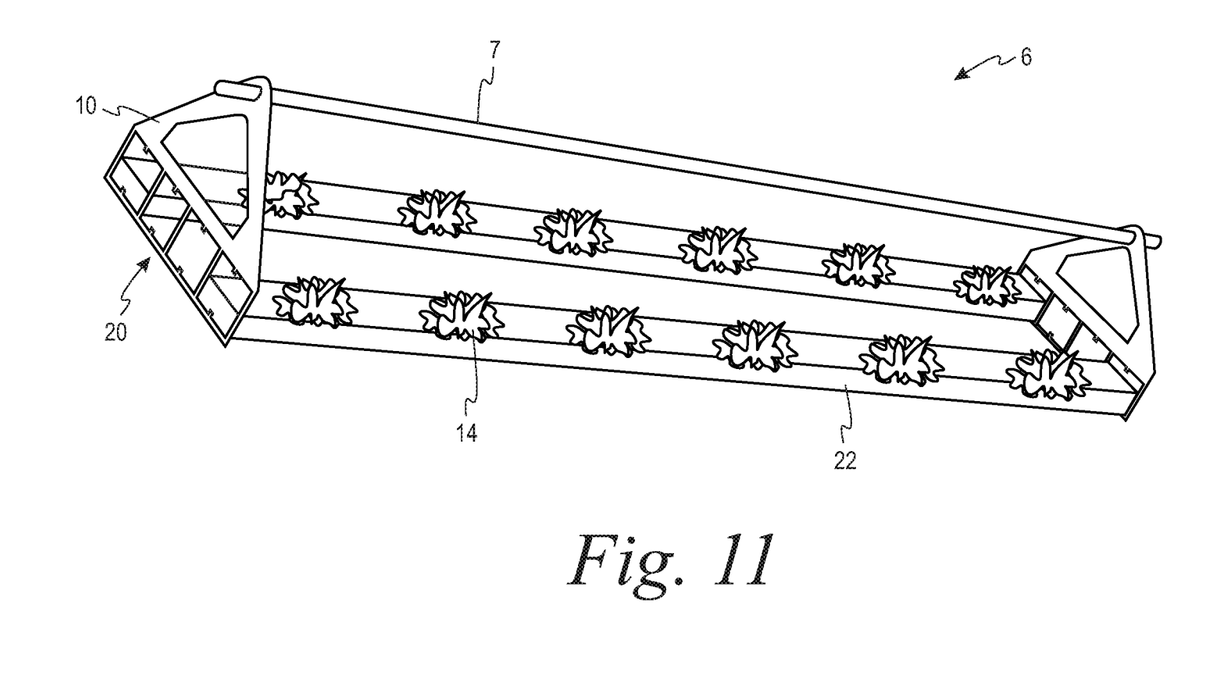
FIG. 11 is an enlarged view of a payload carrying station for an apparatus for growing organic matter.

FIG. 11 is a close up view of a payload carrying station 6 for an apparatus. FIG. 11 shows: tubing shafts 7; triangular side plates 10 comprising square cutouts 20; and a payload carrying tray 22; in addition to other parts of the apparatus. Plants 14 are also shown inside one of the payload carrying stations 6.

One embodiment of the invention may comprise a modular vertical support frame 2, which may be made of tubing, including but not limited to, circular, square or rectangular tubing. Modular may refer to the support frame's ability to couple to other components. For example, as shown in FIGS. 1 and 9, at least one support frame 2 piece may be configured to attach to at least a second support frame 2 piece. In a preferred embodiment, the support frame 2 may be braced horizontally with supports 12, such as with, for example, cross supports or spars, and may house a horizontal through shaft 8 with two modular and detachable sprockets 4. As shown in FIG. 4, the support frame 2 may comprise custom cutouts 17. The cutouts 17 may comprise a hole that may be configured to detachably receive a horizontal through shaft 8, as shown in FIG. 3. Additionally, the cutouts 17 may comprise a slit 26 and the kidney-bean shaped pocket 25 which may allow for and help limit the amount of shaft movement and/or apparatus oscillation from a pivot point. The through shaft 8 may be connected to a gear-motor comprising a primary mover 24, such as, for example, an electric motor, gear reducer, and variable frequency drive, at least two detachable sprockets 4 and a continuous link-belt 5 and may be attached to, and may indirectly drive, an idler shaft and the two detachable sprockets 4. In a preferred embodiment, the through shaft 8 may be oriented horizontally, and also may comprise two sprockets 4 placed at an appropriate distance apart.

Because the modular vertical support frames 2 may be configured to couple together or detachably connect to each other, the frame 2 structure is dynamic and may be changed and/or configured by the user. The frame 2 may comprise at least one post or a plurality of detachably connected posts, depending on the user's preference. As shown in FIG. 9, an extender-coupler insert 28 may be used in conjunction with the vertical support frames 2 to increase the overall unit height, and therefore capacity, by adding modules to the structure. In one embodiment, the extender-coupler insert 28 may comprise a partition with guide rails or other similar structures, which may be fixed onto the vertical support frames 2, allowing the vertical support frames 2 to be coupled together or detachably connect to each other.

Furthermore, in a preferred embodiment, the modular vertical support frames 2 may be supported by two attached horizontal base 3 frame pieces. The base 3 frame pieces may comprise circular, square or rectangular tubing or any other suitable form. This tubing may be identical to the type of tubing used in the vertical support frame 2, and at least one base 3 frame piece may be oriented and affixed perpendicularly against another base 3 frame piece, as shown in FIG. 1. The base 3 frame pieces may be joined by appropriate methods such as: welding or side support plates; compressing, infixing, fastening, trapping, encapsulating, or containing the horizontal and vertical beams together; or by any other appropriate methods known to those skilled in the art. The vertical base 3 frame pieces may comprise a partition with guide rails, which may be fixed onto the lowest vertical support frame 2, allowing the attached structure to be raised and lowered. The raising and lowering capability is to allow for clearance or a space between the upper portion of the apparatus and the ground at a gap or split 6 between at least one frame 2 piece and at least one base 3 piece. This space may be configured to accommodate apparatuses, including, but not limited to an irrigation tank 11. As shown in FIG. 5, a mobility system 29, including but not limited to one or more hydraulic cylinders, may be used to vertically raise or lower the entire apparatus assembly.

As shown in FIG. 1, an embodiment of the invention may comprise a link-belt 5 which carries a payload in a continuous loop. The payload may comprise any organic matter, including but not limited to plants 14 or any combination of vegetable, herb, mushroom, fruit or plant. The link-belt 5 may attach to the frame 2 and also may attach to a payload carrying station 6, described herein.

The link-belt 5 may comprise at least one channel, tube and/or trough. The channel, tube, and/or trough may be oriented parallel to the ground. The link-belt 5 may further comprise at least one channel, tube or trough. The channels, tubes and/or troughs may comprise sides, bottoms and ends. The channels, tubes and/or troughs may be irrigated by partial or full submersion within a fluid, spray, misting, or by any other appropriate irrigation method.

Moreover, as shown for example in FIGS. 1 and 11, the payload may be suspended on a horizontal tubing shaft 7 that may be connected to, or detachably attach to, the link-belt 5. The tubing shaft 7 may be hollow or solid. The tubing shaft 7 may comprise a first end side support plate 10 and a second end side support plate 10. The tubing shaft 7 may freely rotate about an appropriate bearing, and the side support plates 10 may rotate freely about the tubing shaft, wherein gravity may retain the payload in a predominantly horizontal and level plane position, regardless of the respective payload position in the continuous rotation about the sprockets 4.

Additionally, in a preferred embodiment, the link-belt 5 may be comprised of at least one link with at least one opening at its ends, which may house at least one bearing. Any appropriate type of bearing may be used. At least one link may be configured to connect with at least a second link by any appropriate method including, but not limited to, being strung together with a tubing shaft 7. The tubing shaft 7 may be configured to support a link-belt 5 assembly at both ends. This configuration may form a dual link-belt 5 and tubing shaft 7 assembly. As shown in FIG. 7, the dual link-belt 5 and tubing shaft 7 assembly may then rotate about the sprocket 4 teeth 23 to form a continuous integral loop, latching around and engaging one or more teeth 23 of each sprocket 4.

In a preferred embodiment, the sprocket 4 may have six teeth 23; in other embodiments any appropriate number of teeth 23 may be used. The six-toothed 23 sprocket 4 may be referred to as a hex-sprocket. The sprocket 4 may be modular. Each sprocket 4 may be an assembly, comprising universal side plates, hub and teeth 23. Each tooth 23 may be rotated at least once to prevent wear or once worn over time. The rotation may be at an angle of 120-degrees or another appropriate angle of the user's choosing. The teeth 23 may be configured to connect to a six-sided plate, which may be connected to another six-sided plate and via at least one through-shaft 8 to the frame 2. The plate may have pockets at each of its vertices; each pocket may be configured to accept a tooth 23. As shown in FIG. 7, the pockets may comprise a nut and bolt assembly. The plate may be connected to the vertical frame 2 at a pocket positioned in the center of the plate, housing a universal hub. Any appropriate fastener including but not limited to a bolt may attach the plate at the hub to the through shaft 8. Additionally, at least one tooth 23 of the plate may contact and engage one or more of the link-belt 5 assembly. Additionally, the plate may comprise spokes radiating from the center of the plate to the vertices. The spoked plate may be made out of aluminum or any other appropriate material. Each tooth 23 and/or hub may be made of appropriate material, including but not limited to hardened aluminum alloy or steel.

Certain embodiments of the apparatus may comprise aluminum, stainless steel, and/or plastics. Additionally, any other appropriate materials may be used to construct the apparatus. In a preferred embodiment, the apparatus is comprised of aluminum plate and tubing. When necessary, the aluminum may be hardened, hard-coat anodized, and/or Teflon® treated, to resist corrosion, wear and tear and/or to reduce friction or to comply with various sanitary and/or hygienic concerns or requirements.

Furthermore, in certain embodiments, the tubing shafts 7, the link-belt 5 and the side-support plates 10 may be designed to accept at least one split bearing. The split bearing may be comprised of a polymer including but not limited to: Delrin®, nylon or ultra-high-molecular-weight polyethylene (UHMW) to allow for rotational movement about each respective horizontal axis of the tubing shaft 7. The split bearings may be further separated by washers, thrust bearings or spacers. The washers, thrust bearings and/or spacers may be restrained as necessary by additional objects including but not limited to retaining rings. The retaining rings may contain an external split, a single turn spiral, and/or be comprised of stainless steel.

In addition, in certain embodiments, the payload may be suspended vertically and inward of the belt-link 5 assembly with at least two side-support plates 10. As shown in FIG. 1 and FIG. 11, in a preferred embodiment, the side-support plates 10 may be triangular in shape and may comprise aluminum. In another embodiment, each side-support plate's 10 perimeter may be configured in any other shape of at least three sides—and may comprise any other suitable material including but not limited to aluminum or stainless steel. Additionally, each side-support 10 plate may comprise a cutout 20. The cutout 20 may be configured to accept the desired trays, channels, troughs, or square sleeve. The cutout 20 may be configured in any shape, including but not limited to triangular, circular, or square shaped. In a preferred embodiment, the side-support plate 10 may be triangular in shape, and comprise at least one square-shaped cutout 20 within the base of the triangle. Moreover, in another embodiment, at least one cutout 20 may be attached to the base of the side-support plate 10. The side-support plates 10 may be attached to the tubing shaft 7. The side-support plates 10 may pivot about their respective tubing shafts 7. The side-support plates 10 may rotate about the tubing or the tubing may rotate about the side-support plates 10. In an embodiment, the rotation is aided by a bearing, such as a split-bearing.

In a preferred embodiment, as illustrated in FIG. 11, each payload carrying station 6 may comprise: a tubing shaft 7; at least two side-support plates 10, which may be triangular in shape; at least one tray, one channel, one tube, one trough, one sleeve or one other payload carrying object; at least one horizontal payload carrying tray 22 detachably connected to the side-support plates 10 via fasteners, protrusions or any other suitable method known to those skilled in the art; at least one bearing; at least one washer; and at least one retaining ring. These payload carrying stations 6 may be connected by at least two links to form the continuous link-belt 5 loop around the drive and idler sprocket 4 sets. The links may be connected at opposite ends, and may house a bearing, such as a split-bearing, and retained on the tubing shaft 7 in a varied combination, predicated on loads or need.

Additionally, in one embodiment shown in FIG. 3, belt tension may be achieved by pivoting the lower sprocket 4 assembly about at least one flanged bearing assembly 18. The flanged bearing assembly 18 may be inserted into the frame 2, and may be detachably connected to the through shaft 8. A pocket on the frame 2 may house the flanged bearing assembly 18 and may comprise: at least one kidney bean shaped pocket 25 and slit 26, and one pivot point 27 or other appropriately shaped slot, configured to accommodate at least one through shaft 8 (see FIG. 4); at least one screw; at least one polygon-shaped plate comprising at least one custom cutout 17 to accommodate assembly; and at least one ball bearing placed or inserted between the polygon-shaped plates. The flanged bearing assembly 18 may be fastened to the apparatus by bolts or other appropriate fasteners. The flanged bearing assembly 18 may be made out of any suitable material including but not limited to aluminum or stainless steel. In addition to the flanged-bearing assemblies 18, other appropriate fastening mechanisms may be used.

In one embodiment, each through shaft 8, sprocket 4, and flanged bearing assembly 18 may be mounted to a two-post vertical frame 2 at a distance of a user's choosing to form the vertical spacing desired. The through shaft 8, sprocket 4, and flanged bearing assembly 18 may be mounted through openings in the side walls, affixed with nuts and bolts, and supported by flanged bearings. This arrangement may allow for rotational movement about the horizontal axis. In addition to nuts, bolts and flanged bearings, other appropriate methods may be used to affix and support the through shaft 8, sprocket 4, and/or flanged bearing assembly 18.

In some embodiments, the link-belt 5 and payload carrying station 6 may be actuated by mechanical devices including but not limited to a shaft-mount gear-motor incorporating direct drive of the upper drive shaft comprising a primary mover 24, such as, for example, an electric motor, gear reducer, and variable frequency drive. This actuation system may provide the apparatus the ability to reduce its speed or completely stop, in addition to giving the apparatus variable speed, bi-directional control, including forward and reverse capability. The actuation system may also allow the apparatus to be controlled by remote input. Finally, the primary mover 24 may comprise, or be integrated with existing building and/or plant infrastructure, a computer or micro-computer, and may be networked for local or remote monitoring and operations.

Furthermore, as shown in FIG. 1, a tank 11 may be detachably connected at the base of the structure. Any appropriate fastening mechanism may be used, including but not limited to nuts and bolts. Additionally, the tank 11 may be unconnected to the structure. The tank 11 may house the liquid and dilutions requisite for the payload, including but not limited to: water, dissolved oxygen, nutrients and when required, minerals. The tank 11 also may house and support aquaculture, where plants or other aquatic life may reside and be cultivated. The tank 11 may comprise a bottom face, top face, front face, back face, and sides. The faces and sides may be made out of any suitable material, including but not limited to aluminum or stainless steel. The tank 11 may be at least partially open on its top face. Additionally, the tank 11 may be elevated to accommodate support infrastructure, including but not limited to pumps, plumbing, and a support frame. A main tank riser or multiple risers may also be added; the riser may be attached by at least one bolt or by using other appropriate attachment mechanisms. The tank riser may increase the capacity of the original tank 11.

Additionally, in certain embodiments, supplemental and additional tank modules may be added as desired. The supplemental tank modules may be used to increase the amount of fluid that may be contained by the apparatus. Additionally, the supplemental tank modules may be used to house fluid transferred from the main tank or provide for varied fluids, such as feedstocks. Fluid transfer may be actuated by mechanical devices, including but not limited to pumps or valves, or by gravity. Pumps and valves may control the flow of liquid bi-directionally, either via manual inputs or through electromechanical devices including, but not limited to, valves, solenoids, and/programmable logic controllers (PLCs). Additionally, computer controlled programs, software programs, or any other control mechanisms may be used to control tank supply and/or the fluid management system. Furthermore, the main tank 11 may be configured to detachably connect to at least one supplemental tank. Supplemental tanks may be inserted into the main tank or stacked above the main tank 11 as desired. A support frame may be detachably connected to the supplemental tank. The tanks 11 may be configured to accommodate detachable objects for spraying, blowing or misting the payload. The spray, misting or blowing systems may perform operations, including but not limited to supplying gases, washing, and fluid applications. The detachable devices may be connected at the tank 11 or the vertical support frame 2. A blowing system may be configured to release carbon dioxide or other appropriate gasses in a controlled manner.

With regard to lighting, in addition to natural light, the apparatus may be configured to accommodate at least one light bar 9 including but not limited to Philips® 48- and 60-inch overall length ("OAL") LED-GP series production modules. A light bar 9 may also include incandescent, halogen, fluorescent or LED bulbs and/or lighting, or any other appropriate lighting device known to those skilled in the art. A light bar 9 may be attached at various locations along the top portion of the apparatus, above the highest link-belt 5, e.g., the "crown" 1 of the apparatus. At least one light bar 9 may be attached to at least one horizontal support 12. The horizontal support 12 may reinforce the vertical support frames 2. Furthermore, at least one light bar 9 may be attached to the smaller open areas of the structure—predominately the area available between the shaft-sprocket 4 assemblies—which does not interfere with the sprocket assemblies 4 or the payload carrying station 6. In one embodiment, lighting support plates or brackets, step-up plates and/or step-down plates are used to attach at least one light bar 9 to the structure. At least one horizontal support 12 may be configured to connect to at least one lighting support bracket. The lighting support brackets, including the step-up and/or step-down plates, may be free-floating on the horizontal support 12 and comprise pockets. The pockets may be of various sizes and angles. The lighting support brackets also may guide, support, align and retain the light-bars, including ancillary cabling, spray bars and various supply lines. Moreover, at least one step-up/step-down support bracket may allow the installable reach and number of lights to be extended; at least one shorter light bar 9 may be included to accommodate the requisite clearance from the payload carrying stations 6, through shafts 8 and/or sprockets 4.

In certain embodiments, and while the apparatus is stationary, the light bars 9 may be increased or decreased in number and/or fixed in position. Furthermore, the payload may rotate in a loop and may also oscillate, due to the sprocket 4 and link-belt 5 design described herein. This may provide a more uniform light distribution and also misting distribution for the payload, among other benefits.

Power for the artificial lighting may be supplied by a cord, plug or by any other appropriate method. In certain embodiments, the power source may be connected to or integral with one of the two-post vertical support frames 2; this connection may be placed at the inside of the frames, various tubes and/or shafts. At least one frame 2 may comprise ingress and egress intrusion along the sides and/or outside of the frame 2. The cord may travel from at least one intrusion and detachably connect to at least one light bar 9, providing power to the light bars 9. In a preferred embodiment, the light bar 9 may comprise LED lights. The LEDs may be powered by an electrical cord or any other appropriate power supply, and may be arranged in a horizontal or vertical configuration. This power supply configuration may allow for year-round plant, aquatic and crop production in any environment, topography, soil or climate, including but not limited to indoor environments. In some embodiments, electricity and other supply lines may be routed from a ceiling or rafters, to the top of the apparatus and then toward the bottom—down to a lower vertical rail—where it may be further distributed, both vertically and horizontally, across the apparatus. In addition, further appropriate power and signal distribution devices including but not limited to plugs, connectors and sockets, may be detachably placed along the apparatus for safety and mobility. Other objects, including but not limited to tanks 11, may be housed, attached or routed similarly. A routing system may provide water, nutrients, and various air or gasses to the payload. One embodiment of the routing system may include at least one cable tray, at least one slotted wire duct, at least one hose, at least one cable duct routed on and/or through at least one support frame 2, at least one base 3 piece, and/or other support infrastructure, such as the horizontal support 12, light bar 9 and outrigger 37. Finally, transfer supply lines and drainage may be centralized and concentrated at one end and more commonly opposite of the power side of the apparatus.

Certain embodiments of the apparatus may be designed with standard mounts to accept at least one adaptive hard-mounting point 21 at the horizontal and vertical frame 2 structure. The hard-mounting point 21 may be configured to allow different attachments to be added or removed. As shown in FIG. 6, such mounts may be configured to accommodate, among other, detachable outriggers 37. The outriggers 37 may be used for connecting additional lighting 39, attaching cooling fans 38, supporting paneling, in conjunction with the framing 2, where partial or full enclosure is desired, for among other things, operator safety, improved environmental control, and connecting any other appropriate devices. The lighting 39, fans 38, and additional devices may be configured to accept one or more hard-mounting points 21 or additional support infrastructure such as with expanded automation. As shown in FIG. 3, the hard-mounting points 21 on frame 2, and other mounting points elsewhere, such as a horizontal support 12, may be used to help manage the payload, performing functions, including but not limited to seeding, maintenance, pollinating, spraying, fogging, monitoring, harvesting, and packaging. Moreover, devices may be attached to the outrigger 37, or main apparatus, that may help clean and prepare the apparatus' infrastructure for further use or serve any other appropriate function. Finally, aeration, filtration, recirculation, environmental controls, feeders and other aquaponic-related equipment may also be attached from these standard mounts, the frame 2, the base 3, and/or a horizontal support 12. Further automation may include mechatronics with additional capabilities, including but not limited to controlled seeding, direct-nutrient watering, fogging, pruning, pollinating and harvesting, along with cleaning and preparation for further payload requirements, such as packaging. One such embodiment may accept the mounting of at least one collaborative robot or other such programmable device, and may be, in addition, integrated electromechanically via a stepper motor and linear drive and controller, to the apparatus or the mobility system 29, further enhancing the system.

In some embodiments, an aquaculture tank 11 may be attached to the bottom of the apparatus. The tank 11 may grow and house aquatic plants and animals. The main tank 11 may be configured to accommodate tank extensions. The aquatic culture may comprise freshwater plants and fish varieties, including but not limited to: Watercress, Tilapia, Perch, Trout, Barramundi, Prawns and/or Crayfish.

As shown in FIG. 5, some embodiments may comprise a mobility system 29. The mobility system 29 may be called a shuttle. Mobility may be achieved by attaching a tubing beam 30, which may be U-shaped and comprise at least two legs, to at least one base support frame 3. At least one leg of the tubing beam 30 may house a lifting system comprising hydraulic cylinders and ball-transfers or bearings, mounted at appropriate distances apart. The mobility system 29 may be capable of elevating the entire apparatus and ancillary attachments, therefore providing multi-directional mobile capability. The mobility system 29 also may have the ability to elevate the two-post vertical frame 2, in order to clear any obstructions on the ground, including but not limited to a tank 11. One embodiment of the invention may contain a gap or split 16 between at least one interconnected frame 2 piece and at least one base 3 piece that may be opened or closed to raise or lower portions of the apparatus. The interconnected frame 2 piece and base 3 piece are removably attached at the gap or split 16. The mobility system 29 may further comprise devices for lifting, including but not limited to a hand pump 31 or electrical drive motor. The mobility system 29 may be detachably connected to the main infrastructure of the apparatus by fasteners, including but not limited to nuts and bolts. The mobility system 29 may also contain a cable carrier 36 connecting at least one of the apparatus' support frame 2 and base 3 pieces, allowing for power, cabling and other umbilical requirements in addition to mobility, to power and/or communicate with the main apparatus. Finally, at least one ball bearing 33 may be attached to the base 3, or to other hardware and/or cylinders, of the mobility system 29 by an appropriate fastener and may touch the ground or floor. The ball bearing 33 may allow the mobility system 29 to roll on the floor, giving the system the ability to achieve multi-directional motion. A further extension of automation may allow for powered mobility of the mobility-system 29 with any of the common known methods familiar to those in the art, including but not limited to a wheeled and battery powered direct-current electric motor, drive and/or controller with or without remote control or automated guidance.

Certain embodiments of this invention may comprise a plurality of payload carrying stations 6 linked together to form a continuous link-belt 5. The payload carrying stations 6 may hold organic matter, including but not limited to plants 14. The link-belt 5 may be oriented vertically, while the payload carrying stations 6 may be oriented horizontally. The link-belt 5 may be in contact with, connected to and/or engaged with at least one drive sprocket 4 and at least one idler sprocket 4. The sprockets 4 may be attached to at least one through shaft 8 and to at least one support frame 2. The support frame 2 may comprise at least two posts and may be modular. Moreover, a tank 11 may be attached to the support frame 2. The tank 11 may hold liquid, with the liquid comprising nutrients for nourishing the aquatic plants, aquatic animals, and/or the payload, including but not limited to plants 14. Furthermore, a motorized drive mechanism, described here as the prime mover 24, including but not limited to an engine to rotate the link-belt 5. The drive mechanism may allow the belt to move at various speeds, and may stop and start the link-belt 5 when directed. Additionally, when moving, the link-belt 5 may transport at least one payload carrying station 6 through the tank 11, wherein the payload may be fully or partially submerged in the liquid.

Certain embodiments of this invention may employ a liquid mister 40. The mister 40 may be attached to the vertical support frame 2 and/or to one or more horizontal supports 12 and connected to the liquid supply. When a payload carrying stations 6 passes through the mister's 40 line of spray, any plants 14 within the payload carrying stations 6 may be hydrated and nourished. Moreover, payload carrying stations 6 may be added to the link-belt 5 as needed, making the system adjustable and dynamic.

Furthermore, an embodiment may comprise devices configured to raise and lower the apparatus. A hydraulic or mechanical motor may propel the apparatus in an upward or downward direction. Moreover, the apparatus may be supported by ball bearings 33, allowing the system to achieve multi-directional motion. The ball bearings 33 may make contact with the ground or floor. Additionally, jacking bolts or separate leveling cylinders in addition to the ball bearing 33 may connect to the ground or floor.

An embodiment of the invention also may comprise at least one method for irrigating and growing organic matter, including but not limited to plants 14. One preferred method may comprise at least one or more of the following: assembling the apparatus as described above; placing growth medium, including but not limited to soil or soil substitutes in at least one tray, trough or sleeve; placing organic material, including but not limited to plants 14 in at least one payload carrying station 6; placing irrigating liquid, including but not limited to water, in the main tank 11 and any supplemental tanks; illuminating at least one light bar 9 by connecting it with a power source; actuating the apparatus, including the link-belt 5 assembly, by plugging a power cord into an electrical outlet; and misting the organic material using a mister 40.

The invention also may comprise at least one method for assembling the apparatus. One method may comprise detachably connecting one or more of the following: at least one crown piece 1 at the top of at least one support frame 2 piece; at least one base 3 frame piece to the bottom of at least one support frame 2 piece; at least one sprocket 4 via a through shaft 8 to at least one bearing assembly 18, to at least one support frame 2 piece; at least one tray, one channel, one tube, one trough, one sleeve or one other payload carrying object to at least one side support plate 10, to at least one tubing shaft 7 to form a payload carrying station 6; at least one link-belt 5 assembly to at least one sprocket 4; at least one light bar 9 to at least one horizontal support 12; at least one horizontal support 12 to at least one support frame 2 piece; an outrigger 37 to at least one support frame 2 piece, or base 3 frame piece; at least one tank 11 to at least one base 3 frame piece; a mobility system 29 to at least one base 3 frame piece; and may house a power system, including but not limited to at least one power cord to: at least one light bar 9, the outrigger 37, and at least one prime mover or motor driving the apparatus' through shaft 8 and sprocket 4 and link-belt 5 assembly.

While a preferred embodiment of the present invention has been disclosed and described herein for purposes of illustration and not for purposes of limitation, it will be understood by those skilled in the art that various changes in form and detail may be made therein without departing from the spirit and scope of the invention.

Overall shape and design features are not limited by characteristics of the assembly, or components described in the descriptions, summary and abstract.

Overall method steps are not limited by the steps described in the descriptions, summary and abstract.

The invention claimed is:

1. An apparatus for growing organic matter comprising:
a first plurality of links wherein at least one link of said first plurality of links is configured to connect with at least a second link of said first plurality of links to form a continuous first link belt;
a second plurality of links wherein at least one link of said second plurality of links is configured to connect with a second link of said second plurality of links to form a continuous second link belt;
at least one tubing shaft connected to said first link belt and said second link belt;
at least one payload carrying station that holds a payload comprising organic matter, wherein said station is connected to said tubing shaft;
a plurality of support frames comprised of at least one first support frame and at least one second support frame;
wherein at least two first sprockets are connected to said first support frame;
wherein at least two second sprockets are connected to said second support frame;
wherein each of said first and second sprockets have at least six teeth;
said first link belt is configured to engage and rotate said first sprockets;
said second link belt is configured to engage and rotate said second sprockets; and
at least one of said first sprocket or said second sprocket is actuated by a device to rotate said first link belt or said second link belt.

2. An apparatus for growing organic matter comprising:
a first plurality of links wherein at least one link of said first plurality of links is configured to connect with at least a second link of said first plurality of links to form a continuous first link belt;
a second plurality of links wherein at least one link of said second plurality of links is configured to connect with a second link of said second plurality of links to form a continuous second link belt;
at least one tubing shaft connected to said first link belt and said second link belt;
at least one payload carrying station that holds a payload comprising organic matter, wherein said station is connected to said tubing shaft;
a plurality of support frames comprised of at least one first support frame and at least one second support frame;
wherein at least two first sprockets are connected to said first support frame;
at least two second sprockets are connected to said second support frame;
said first link belt is configured to engage and rotate said first sprockets;
said second link belt is configured to engage and rotate said second sprockets;
at least one of said first sprocket or said second sprocket is actuated by a device to rotate said first link belt or said second link belt; and
at least one outrigger.

3. An apparatus for growing organic matter comprising:
a first plurality of links wherein at least one link of said first plurality of links is configured to connect with at least a second link of said first plurality of links to form a continuous first link belt;
a second plurality of links wherein at least one link of said second plurality of links is configured to connect with a second link of said second plurality of links to form a continuous second link belt;

at least one tubing shaft connected to said first link belt and said second link belt;

at least one payload carrying station that holds a payload comprising organic matter, wherein said station is connected to said tubing shaft;

a plurality of support frames comprised of at least one first support frame and at least one second support frame;

wherein at least two first sprockets are connected to said first support frame;

at least two second sprockets are connected to said second support frame;

said first link belt is connected to said first sprockets;

said second link belt is connected to said second sprockets;

at least one of said first sprocket or saod second sprocket is actuated by a device to rotate said first link belt or said second link belts;

a plurality of base frames comprised of at least one first base frame and one second base frame;

at least one first split between at least one said first support frame and at least one said first base frame, wherein said first support frame is removably attached to said first base frame;

at least one second split between at least one said second support frame and at least one said second base frame, wherein said second support frame is removably attached to said second base frame; and said support frames are capable of being raised or lowered at said splits.

4. The apparatus for growing organic matter of claim 3, further comprising at least one hydraulic cylinder, wherein said hydraulic cylinder is capable of raising or lowering said support frames.

5. The apparatus for growing organic matter of claim 3, further comprising at least one mechanical motor, wherein said mechanical motor is cable of raising or lowering said support frames.

6. The apparatus for growing organic matter of claim 3, further comprising at least one ball bearing.

7. The apparatus for growing organic matter of claim 3, further comprising at least one cable carrier, wherein said cable carrier is connected to at least one said support frame and said base frame.

8. An apparatus for growing organic matter comprising:
a first plurality of links wherein at least one link of said first plurality of links is configured to connect with at least a second link of said first plurality of links to form a continuous first link belt;

a second plurality of links wherein at least one link of said second plurality of links is configured to connect with a second link of said second plurality of links to form a continuous second link belt;

at least one tubing shaft connected to said first link belt and said second link belt;

at least one payload carrying station that holds a payload comprising organic matter, wherein said station is connected to said tubing shaft;

at least one first support frames;

at least one second support frames;

wherein at least one of said first support frames is configured to attach to at least one of said second support frame and wherein at least two first sprockets are connected to said first and second support frames;

at least one third support frames;

at least one fourth support frames;

wherein at least one of said third support frame is configured to attach to at least one of said fourth support frame and wherein at least two second sprockets are connected to said third and fourth support frames;

said first link belt is connected to said first sprockets;

said second link belt is connected to said second sprockets; and at least one of said first sprocket or said second sprocket is actuated by a device to rotate said first link belt or said second link belts.

9. The apparatus for growing organic matter of claim 8, further comprising at least one cutout, said cutout configured to receive a through shaft.

10. The apparatus for growing organic matter of claim 9, wherein said cutoutcomprises at least one slit and kidney-bean shaped pocket.

11. The apparatus for growing organic matter of claim 8, further compris n a least one extender-coupler insert.

12. The apparatus for growing organic matter of claim 11, wherein said extender-coupler insert comprises a partition with at least one guide rail.

13. An. method for growing organic matter comprising:
connecting a first plurality of links wherein at least one link is configured to connect with at least a second link to form a continuous first link belt;

connecting a second plurality of links wherein at least one link is configured to connect with a second link to form a continuous second link belt;

connecting at least one tubing shaft to said first link belt and said second link belt;

configuring at least one payload carrying station to hold a payload comprising organic matter;

connecting said station to said tubing shaft;

connecting at least two first sprockets to at least one first support frame;

connecting at least two second sprockets to at least one second support frame;

connecting said first link belt to said first sprockets;

connecting said second link belt to said second sprockets;

actuating said at least one of said first sprocket or said second sprocket using a device to rotate at least one said first link belt or said second link belt;

removably attaching at least one said first support frame to at least one first base frame;

removably attaching at least one said second support frame to at least one second base frame;

raising or lowering at least one said first support frame at a first split between said first support frame and said first base frame; and raising or lowering at least one said second support frame at a second split between said second support frame and said second base frame.

* * * * *